US012668378B1

(12) United States Patent
    Senuysal et al.

(10) Patent No.:   US 12,668,378 B1
(45) Date of Patent:       Jun. 30, 2026

(54) SYSTEMS AND METHODS FOR REPAIRING AIRCRAFT COMPONENTS USING GEOMETRIC ADAPTIVE MACHINING

(71) Applicant: General Electric Company, Evendale, OH (US)

(72) Inventors: Hilal Senuysal, İstanbul (AR); Donovan Buckley, Colonie, NY (US); Henry Ng, Cincinnati, OH (US); Suhas Prabhakar Vaze, Loveland, OH (US); Muhittin Caner Eksioglu, Mason, OH (US); Jonathan David Mast, Lebanon, OH (US); Ngan Ming Lee, Singapore (SG); Clark Trost, Vandalia, OH (US); Vysakh Venugopal, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/214,727

(22) Filed: May 21, 2025

(51) Int. Cl.
    | | |
    |---|---|
    | B64F 5/40 | (2017.01) |
    | B23P 6/00 | (2006.01) |
    | F01D 5/00 | (2006.01) |
    | G05B 19/401 | (2006.01) |

(52) U.S. Cl.
    CPC ................. B64F 5/40 (2017.01); B23P 6/00 (2013.01); B23P 6/002 (2013.01); F01D 5/005 (2013.01); G05B 19/401 (2013.01); *F05D 2230/80* (2013.01); *G05B 2219/45147* (2013.01)

(58) Field of Classification Search
    CPC . B23P 6/00; B23P 6/002–007; B23P 2700/01; B64F 5/40; F01D 5/005; F05D 2230/80;

G05B 19/401; G05B 2219/45147; Y10T 29/49318; Y10T 29/49732–49744
See application file for complete search history.

(56)                References Cited

U.S. PATENT DOCUMENTS

| | | | |
|---|---|---|---|
| 3,784,798 | A | 1/1974 | Beadle |
| 7,033,979 | B2 | 4/2006 | Herwig |
| 7,472,478 | B2 | 1/2009 | Graham |
| 7,797,828 | B2 | 9/2010 | Beeson |
| 8,028,936 | B2 | 10/2011 | Mcdermott |
| 8,277,647 | B2 | 10/2012 | Rice |
| 8,578,579 | B2 | 11/2013 | Rangarajan |
| 8,844,132 | B2 | 9/2014 | Blais |
| 9,138,782 | B2 | 9/2015 | Dorshimer |
| 9,498,847 | B2 | 11/2016 | Alistair |
| 9,739,168 | B2 | 8/2017 | Ekanayake |
| 9,926,517 | B2 | 3/2018 | Tibbetts |

(Continued)

FOREIGN PATENT DOCUMENTS

| | | |
|---|---|---|
| CN | 117232432 | 12/2023 |
| DE | 102013202616 A1 | 8/2014 |

(Continued)

*Primary Examiner* — Matthew P Travers
(74) *Attorney, Agent, or Firm* — Fitch, Even, Tabin & Flannery LLP

(57)                ABSTRACT

A method of reshaping and reconstruction includes removing a deformed portion of a component to define a native component portion and adding a replacement portion to the native component portion. The replacement portion is adaptively machined based on one or more parameters of the native component portion and based on one or more original design parameters of the component.

18 Claims, 4 Drawing Sheets

(56)                References Cited

U.S. PATENT DOCUMENTS

| | | | |
|---|---|---|---|
| 9,932,854 | B1 | 4/2018 | Tibbetts |
| 9,951,647 | B2 | 4/2018 | Rawson |
| 9,957,066 | B2 | 5/2018 | Bewlay |
| 10,005,111 | B2 | 6/2018 | Eriksen |
| 10,012,976 | B2* | 7/2018 | Louesdon .......... G05B 19/4097 |
| 10,018,113 | B2 | 7/2018 | Bewlay |
| 10,227,891 | B2 | 3/2019 | Eriksen |
| 10,323,539 | B2 | 6/2019 | Bewlay |
| 10,377,968 | B2 | 8/2019 | Brooks |
| 10,385,723 | B2 | 8/2019 | Flynn |
| 10,452,809 | B2 | 10/2019 | Huckerby |
| 10,634,004 | B2 | 4/2020 | Giljohann |
| 10,669,885 | B2 | 6/2020 | Pecchiol |
| 10,920,181 | B2 | 2/2021 | Martin |
| 10,947,849 | B2 | 3/2021 | Karigiannis |
| 10,955,815 | B2 | 3/2021 | Auxier |
| 11,027,317 | B2 | 6/2021 | Tibbetts |
| 11,067,203 | B2 | 7/2021 | Berezin |
| 11,400,550 | B2 | 8/2022 | Shin |
| 11,441,446 | B2 | 9/2022 | Rawson |
| 11,905,845 | B1 | 2/2024 | Gillaugh |
| 2004/0083024 | A1* | 4/2004 | Wang ..................... B23K 26/32 |
| | | | 700/195 |
| 2005/0246052 | A1* | 11/2005 | Coleman ......... G05B 19/40937 |
| | | | 700/190 |
| 2009/0112357 | A1* | 4/2009 | Hammond ......... G05B 19/4086 |
| | | | 700/194 |
| 2014/0257551 | A1* | 9/2014 | Junod ............... G05B 19/4097 |
| | | | 700/173 |

| | | | |
|---|---|---|---|
| 2015/0153728 | A1* | 6/2015 | Eckley ............... G05B 19/4207 |
| | | | 700/109 |
| 2015/0159122 | A1 | 6/2015 | Tibbetts |
| 2017/0165721 | A1 | 6/2017 | Tibbetts |
| 2017/0167290 | A1 | 6/2017 | Kulkarni |
| 2017/0191376 | A1 | 7/2017 | Eriksen |
| 2017/0204739 | A1 | 7/2017 | Rawson |
| 2017/0254217 | A1 | 9/2017 | Eriksen |
| 2018/0149038 | A1 | 5/2018 | Eriksen |
| 2018/0155060 | A1 | 6/2018 | Dauenhauer |
| 2018/0216036 | A1 | 8/2018 | Tibbetts |
| 2018/0237163 | A1 | 8/2018 | Bewlay |
| 2018/0245477 | A1 | 8/2018 | Kulkarni |
| 2018/0258787 | A1 | 9/2018 | Tibbetts |
| 2018/0291803 | A1 | 10/2018 | Belay |
| 2018/0298781 | A1 | 10/2018 | Tibbetts |
| 2018/0313225 | A1 | 11/2018 | Millhaem |
| 2018/0355751 | A1 | 12/2018 | Tibbetts |
| 2019/0153890 | A1 | 5/2019 | Eriksen |
| 2019/0323378 | A1 | 10/2019 | Tibbetts |
| 2020/0064809 | A1* | 2/2020 | Sanders ................. G06F 30/17 |
| 2020/0265122 | A1* | 8/2020 | Razzell ................. G06F 30/17 |
| 2021/0108537 | A1 | 4/2021 | Rigg |
| 2021/0317752 | A1 | 10/2021 | Deja |

FOREIGN PATENT DOCUMENTS

| | | |
|---|---|---|
| DE | 102015006330 | 11/2016 |
| FR | 3055822 | 3/2018 |
| WO | 2020022474 A1 | 1/2020 |
| WO | 2020030516 A1 | 2/2020 |

* cited by examiner

SYSTEMS AND METHODS FOR REPAIRING AIRCRAFT COMPONENTS USING GEOMETRIC ADAPTIVE MACHINING

TECHNICAL FIELD

This disclosure relates generally to machining, and more particularly to a system and method for adaptive machining of aircraft components.

BACKGROUND

In various industries, including aerospace, parts are often designed with specific 3D complex shapes for functional reasons, such as aerodynamics. Producing these components require time consuming and expensive manufacturing techniques. Over time, components like airfoils require repairs due to damage, particularly to the leading edge and/or tip, which is vulnerable to rubs, foreign object impact and erosion. Repairing and reconstructing these parts by adaptive machining can yield considerable cost savings and repeatability to aircraft operators.

Traditionally, the repair process involves machining the damaged area, applying weld material, and re-machining the part to meet the original design intent. The component is then machined and hand-finished to restore it to a serviceable condition. However, this method has several drawbacks. First, the post-weld machining operation leaves excess material, which must be removed through labor-intensive hand finishing. Second, since parts are typically not machined close to specification to avoid under-minimum dimensions, the processing time of the manual finishing operation is increased, which can generate substantial re-work or scrap.

BRIEF DESCRIPTION OF DRAWINGS

Disclosed herein are embodiments of systems, apparatuses and methods pertaining to systems and methods for reshaping, reconstructing, and constructing aircraft components using geometric adaptive machining (GAM). This description includes drawings, wherein.

Figure 1:
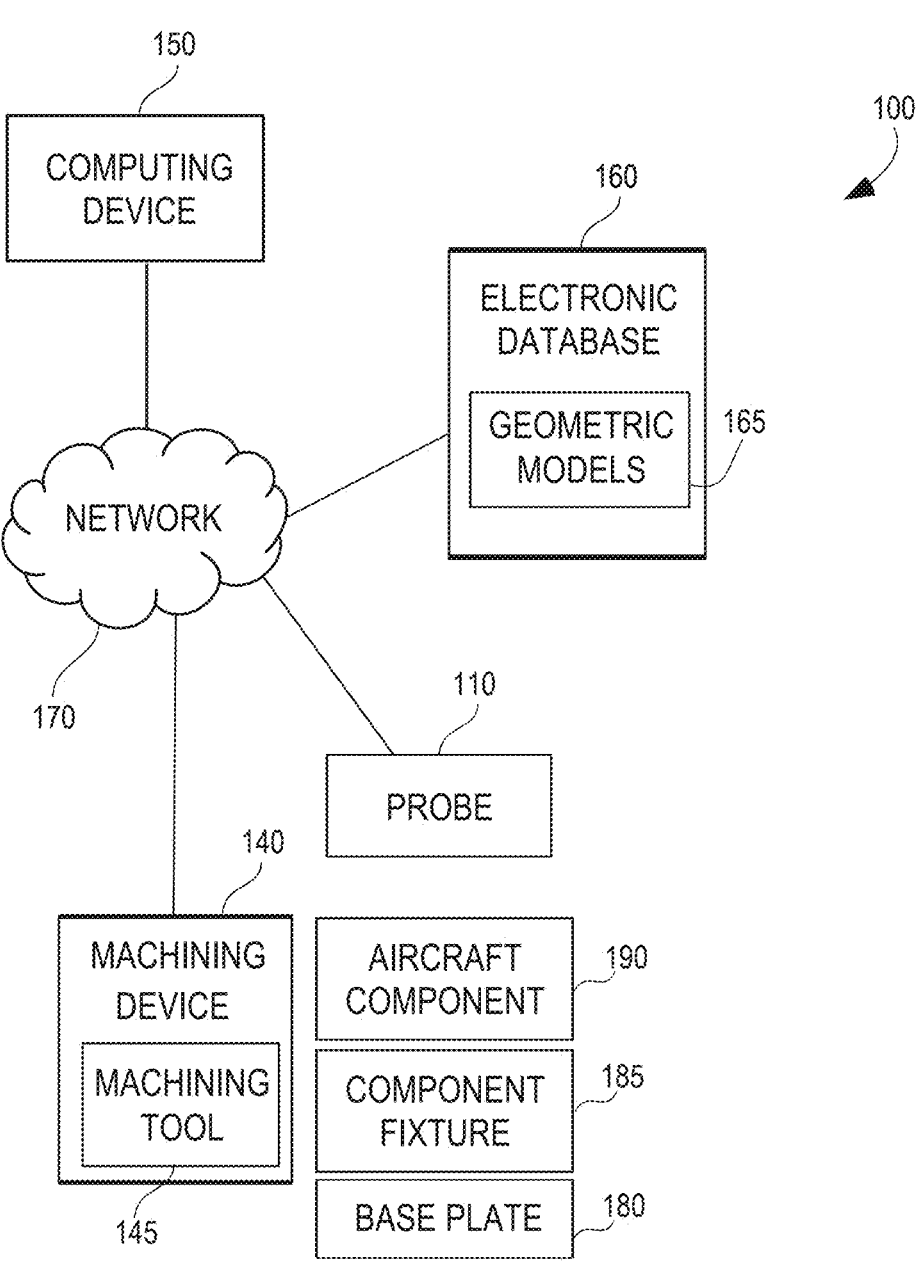
FIG. 1 is a block diagram of a system of repairing/reshaping and reconstructing aircraft components using geometric adaptive machining in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses, and methods are provided herein useful for reshaping and reconstructing aircraft components and/or constructing new aircraft components using adaptive machining. More specifically and described in greater detail below, the approaches described herein provide precise control of a machining process (e.g., reshaping or reconstruction) for an aircraft component. These approaches also allow for more consistent and efficient machining processes, which achieve a final post-machining shape of the aircraft component that closely matches the target geometry of the aircraft component.

Advantageously, the approaches provided herein enable machine automation to be used in the reshaping and reconstruction process of aircraft components. In doing so, these approaches provide a geometric adaptive machining process that may reduce manual hand-finishing, saving time and labor cost, while improving the accuracy and precision of the machining operations. Additionally, the geometric adaptive machining processes may be used both field-returned and new-make aircraft parts, which thereby can yield cost savings and repeatability to aircraft operators.

In some embodiments, a system for reshaping and reconstructing an aircraft component via geometric adaptive machining includes a measurement device to detect a size and shape of the aircraft component, an electronic database storing geometric models corresponding to post-machining target sizes and shapes of aircraft components, a machining device to machine the aircraft component, and a computing device. The computing device is configured to pre-align a coordinate system associated with the aircraft component with a coordinate system of the machining device to create an aligned coordinate system; select, from the electronic database, a geometric model corresponding to a post-machining target size and shape of the aircraft component; process measurement data, generated by the at least one measurement device, of the aircraft component at multiple points in the aligned coordinate system, to identify one or more deviations of the aircraft component from the selected geometric model; in response to an identification of the one or more deviations of the aircraft component from the selected geometric model, generate a corrected path of the machining tool; and cause the machining device to move the machining tool along the generated corrected path of the machining tool to machine the aircraft component.

Figure 4:
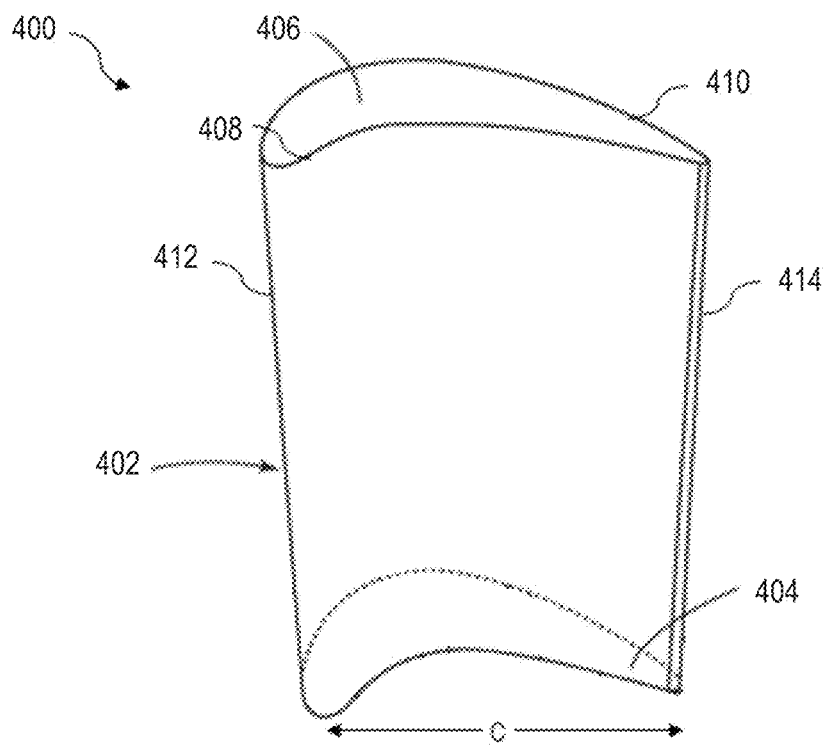
FIG. 4 is a simplified representation of an aircraft component in accordance with several embodiments.

Referring to FIGS. 1 and 4, an adaptive machining system 100 used for reshaping and reconstructing an aircraft component 190 such as, for example, an airfoil of an aircraft engine, is illustrated in accordance with certain embodiments of the present technique. Reshaping and/or reconstructing an aircraft component 190 may involve machining (which, in some aspects, may be preceded by welding or additive manufacturing) the aircraft component 190 to repair physical damage including but not limited to a deformation, an undesirable shape, or a combination thereof. In some aspects, the reshaping and/or reconstructing the aircraft component 190 may involve manufacturing (which, in some aspects, may be preceded by welding or additive manufacturing) the aircraft component 190 as a new-make part.

As shown in FIG. 4, in some embodiments the aircraft component 190 is in the form of an airfoil 402. The airfoil 402 extends from a root 404 to a tip 406, and includes a concave side 408 joined to a convex side 410. A leading edge 412 and a trailing edge 414 are defined at the junction between the concave side 408 and the convex side 410. As shown in FIG. 4, the airfoil 402 includes a chord distance "C" defined as the length between the leading edge 412 and the trailing edge 414. The chord distance "C" may be generally the same axially or may vary axially between the root 404 and the tip 406.

Referring back to FIG. 1, the exemplary system 100 includes a measurement device 110 (which may be a single probe or two or more identical or different probes and which may be a tactile probe, a non-tactile vision system, or the like) configured to generate a set of measurement points on the aircraft component 190. In some aspects, the measurement device 110 may be a touch trigger probe, which makes contact with a surface of the aircraft component 190 at one or more points and generates a signal that a measurement has been taken. In some implementations, the measurement device 110 may be a scanning probe, which continuously moves along the surface of the aircraft component 190 while collecting data (e.g., a stream of data points).

In some aspects, the measurement device 110 is configured to detect an overall size and shape of the aircraft component 190. For example, an overall length (e.g., chord length, etc.) of the aircraft component 190 may be determined by detecting (i.e., by the measurement device 110) the distance between a leading edge (e.g., leading edge 412 of FIG. 4) and a trailing edge (e.g., trailing edge 414 of FIG. 4) of the aircraft component 190 (e.g., airfoil 402 of FIG. 4). In another example, an overall shape of the aircraft component 190 may be determined by detecting (i.e., by the measurement device 110) one or more specific, pre-determined points on the aircraft component 190 that serve as a reference for further measurements or analysis (e.g., mapping, modeling, etc.) of the overall geometry of the aircraft component 190. In another example, an overall shape of the aircraft component 190 may be determined by detecting (i.e., by the measurement device 110) a maximum thickness of the aircraft component 190 based in part on a twist angle of the aircraft component 190.

In certain aspects, the measurement device 110 is configured to detect twist loss, chord, and/or wall-thickness reduction of the aircraft component 190. Generally, twist loss refers to a deviation or distortion in the shape of the aircraft component 190, where a part of the aircraft component 190 might lose its intended twist or curvature. Notably, twist is an important geometric characteristic in certain aircraft components (e.g., wing structures, turbine blades), where maintaining a precise twist angle is directly related to the aircraft component's performance. For example, on a turbine blade, the twist might be carefully designed to optimize airflow, and if the twist is lost or altered due to machining errors or during engine run, the aircraft component's aerodynamic performance could be compromised.

On the other hand, wall thickness reduction generally refers to a decrease in the thickness of the material of the aircraft component 190 in certain areas, which may result from excessive machining, wear, imperfections in the machining process, or during engine run, which may make the component weaker or more prone to failure. Notably, reducing the wall thickness beyond specified tolerances can lead to weak points in the aircraft component 190, making it susceptible to failure under load.

The system 100 shown in FIG. 1 further includes a machining device 140 that includes a machining tool 145 (which may be a single machining tool or two or more machining tools). In the illustrated embodiment, the machining device 140 of the system 100 is a computer numerical control (CNC) machine that automates the process of shaping and finishing aircraft components 190 with high precision. It will be appreciated that, instead of a CNC machine, the system 100 may include any machining device that represents a suitable alternative to a CNC machine. In some aspects, the machining device 140 may perform various machining operations, for example, milling, drilling, turning, and grinding.

In certain aspects, the machining device 140 is controlled by a computing device 150 running a computer program (e.g., electronic instructions) that controls the movements of a machine tool 145 of the machining device 140 along one or multiple axes (e.g., along 5 axes) based on the overall geometry (i.e., the overall size and shape) of the aircraft component 190 being machined, providing accurate and efficient manufacturing of aircraft components 190.

In the embodiment shown in FIG. 1, the machining device 140 includes a machining tool 145 which may physically remove material from an aircraft component 190 being machined. In some aspects, the machining tool 145 may be a mill (e.g., ball end mill), drill, lathe, grinding wheel, blade, carbide cutting tool, super abrasive tool (e.g., cubic boron nitride tool, etc.), soft brush/stone tool, etc., depending on the type of machining operation being performed on the aircraft component 190.

In the illustrated embodiment, the system 100 includes a base plate 180 and a component fixture 185 secured on the base plate 180 for securing an aircraft component 190 prior to and during the machining of the aircraft component 190 by the machining tool 145 of the machining device 140. In some aspects, the base plate 180 is a rigid, generally flat platform on which the component fixture 185 is secured. The aircraft component 190 (e.g., an airfoil, turbine blade, etc.) is positioned on and/or secured in the component fixture 185 prior to and during the machining by the machining tool 145 of the machining device 140. It will be appreciated that the base plate 180 may be an optional feature of the system 100, and that, in some embodiments, the system 100 may not include the base plate 180.

In certain aspects, the base plate 180 is a base plate that does not include clamping mechanisms. It will be appreciated that other suitable alternatives to such a base plate may be used instead. In these regards, the base plate 180 provides a convenient interface to secure the component fixture 185 in place.

In some aspects, the component fixture 185 is a device or assembly used to secure and hold the aircraft component 190 in place during the machining of the aircraft component 190 by the machining tool 145 of the machining device 140. In some aspects, the component fixture 185 ensures that the aircraft component 190 does not move, shift, or deform while it is being worked on by the machining tool 145 of the machining device 140. In certain implementations, the component fixture 185 may have a flat or contoured surface on which the aircraft component 190 may be disposed. Generally, this flat or contoured surface of the component fixture 185 may be designed to complement the geometry of the aircraft component 190 (e.g., airfoil, blade, etc.) being machined by the machining device 140, which ensures that the aircraft component 190 is securely held in the correct position and orientation prior to and during machining.

In the embodiment illustrated in FIG. 1, the system 100 includes an electronic database 160. In some aspects, the electronic database 160 and the computing device 150 may be implemented as two separate physical devices. It will be appreciated, however, that the computing device 150 and the electronic database 160 may be implemented as a single physical device. In some aspects, the electronic database 160 may be stored, for example, on non-volatile storage media (e.g., a hard drive, flash drive, or removable optical disk) internal or external to the computing device 150, or internal or external to computing devices distinct from the computing device 150. In some embodiments, the electronic database 160 may be cloud-based.

Generally, the electronic database 160 of FIG. 1 may store data associated with geometric machining of the aircraft components 190 by the system 100. In some aspects, the electronic database 160 stores geometric models 165 corresponding to post-machining target geometries of aircraft components 190. A geometric model (e.g., a reduced-chord model or post engine run blade model such as thinner airfoil section models to represent erosion effects, models capturing twist of sections due to engine operation and welding (joining) effects, etc.) may be stored in the electronic database 160 and may serve as a simplified, efficient, and design-compliant reference for the post-machining target geometry (i.e., target size and shape) of aircraft components 190. The geometric model provides a manageable, computationally-lighter representation of the desired post-machining shape of the aircraft component 190, thereby facilitating verification, comparison, and quality control during and after the process of machining of the aircraft component 190. In some aspects, the electronic database 160 may store data representing the measurements (e.g., length, width, height, overall shape, etc.) taken (e.g., by one or more measurement devices 110) with respect to an aircraft component 190.

In certain aspects, 3-D geometric models may be constructed by using field-returned (i.e., used and intended for repair) aircraft components 190 and geometric adaptive machining, instead of creating such geometric models from original new-make CAD models. Probing of multiple sections with a high density of probe points, in conjunction with the fitting, predicting, smoothing, and morphing capabilities of the geometric adaptive machining system, may allow for enhanced control during the machining process.

In the embodiment illustrated in FIG. 1, the system 100 includes a computing device 150 that communicates with the measurement device 110, the electronic database 160, and the machining device 140 (and any other electronic components of the system 100) over a network 170. The network 170 depicted in FIG. 1 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Communication between various electronic devices of system 100 may take place over hard-wired, wireless, cellular, Wi-Fi or Bluetooth networked components or the like. In some aspects, one or more electronic devices of system 100 may include cloud-based features, such as cloud-based application programming interfaces (APIs) and cloud-based memory storage.

The computing device 150 may be a stationary or portable electronic device, for example, a desktop computer, a laptop computer, a tablet, a mobile phone, or any other electronic device including a control circuit (i.e., control unit) that includes a programmable processor. The computing device 150 may provide for data entry and processing as well as for communication with other devices of system 100 via the network 170. The computing device 150 may be located at the same physical location as the electronic database 160, or at a location that is remote to the electronic database 160.

In the embodiment of FIG. 1, the computing device 150 and the machining device 140 are shown as two separate physical devices. It will be appreciated, however, that the computing device 150 and the machining device 140 may be implemented as a single physical device in some embodiments. For example, the computing device 150 can be an onboard computing device of a CNC machine. In addition, in the embodiment shown in FIG. 1, the base plate 180 and component fixture 185 are shown as separate and distinct physical devices relative to the machining device 140. It will be appreciated, however, that machining device 140, base plate 180, and component fixture 185 may be implemented as a single physical device in some embodiments.

As will be discussed in more detail below, in some aspects, the computing device 150 is configured to pre-align a coordinate system associated with the aircraft component 190 (which may be referred to herein as a "Workpiece Coordinate System" or "WCS) with a coordinate system of the machining device 140 (which may be referred to herein as a "Machine Coordinate System" or "MCS") to create an aligned coordinate system. In certain aspects, this pre-alignment is achieved through the application of mathematically determined translations and rotations along all three Cartesian coordinate axes. In some aspects, measurement (e.g., probing, computer vision, etc.) data that defines the position of the aircraft component and the component fixture within the MCS may be used to determine the necessary translations and rotations.

In certain implementations, the computing device 150 may select, from the electronic database 160, a geometric model (e.g., a reduced chord model or post engine run blade model) corresponding to a post-machining target size and shape of the aircraft component 190 that is to be machined by the machining device 140. In these regards, the geometric model may account for the deviations of the aircraft component 190 (e.g., field-returned aircraft component) from nominal shape as a result of engine operation, which thereby allows the machining tool 145 to produce the post-machining target size and shape of the aircraft component 190 with a high degree of precision as further described below. In one example, the geometric model may account for a chord loss or reduced chord length of the aircraft component 190 between a leading edge (e.g., leading edge 412 of FIG. 4) and a trailing edge (e.g., trailing edge 414 of FIG. 4) as a result of engine operation. In another example, the geometric model may account for the twist loss and/or wall-thickness reduction of the aircraft component 190 as a result of engine operation. In some aspects, the post engine run blade model may be generated by measuring the aircraft component 190 on an inspection device (e.g., coordinate measuring machine including touch probes and/or scan probes) and using the inspection data to create an as-is post engine run blade model.

In some embodiments, the computing device 150 is configured to process measurement data relating to an aircraft component 190, which may be generated by measuring the aircraft component 190 with the measurement device 110 at multiple points in the aligned WCS, and to identify one or more deviations of the aircraft component 190 from the geometric model associated with the aircraft component 190 that was selected by the computing device 150. In some aspects, if one or more deviations of the aircraft component 190 from the selected geometric model are identified by the computing device 150, the computing device 150 generates a corrected path of the machining tool 145.

Then, after the computing device 150 generates the corrected path of the machining tool 145 that is predicted by the computing device 150 to cause the post-machining overall size and shape of the aircraft component 190 to match the post-machining target size and shape of the aircraft component 190 within acceptable dimensional tolerances, the computing device 150 causes (e.g., by transmitting a control signal to) the machining device 140 to cause the machining device 140 to move the machining tool 145 along the generated corrected path of the machining tool 145 to machine the aircraft component 190.

In some implementations, the measurement data generated by the measurement device 110 when the measurement device 110 is used to physically probe or measure from a distance the aircraft component 190 may be processed by the computing device 150 to determine an overall length (e.g., chord length) of the aircraft component 190 by detecting a distance (e.g., chord distance "C" of FIG. 4) between a leading edge (e.g., leading edge 412 of FIG. 4) and a trailing edge (e.g., trailing edge 414 of FIG. 4) of the aircraft component 190 (e.g., airfoil 402 of FIG. 4). By the same token, in some aspects, the computing device 150 may process the measurement data generated by the measurement device 110 when the measurement device 110 is used to measure the aircraft component 190 to detect at least one designated reference point on the aircraft component 190 to determine an overall shape (e.g., chord shape) of the aircraft component 190.

In some aspects, the computing device 150 may adjust the position and rotation of the aircraft component 190 in three-dimensional space. This may be achieved using a transformation technique (e.g., a best-fit approach) based on at least six degrees of freedom, which allows the system 100 to align the size and shape of the aircraft component 190 to match the post-machining target geometry of the aircraft component 190. Additionally, the computing device 150 may apply a transformation (e.g., a best-fit transformation) to the machining coordinate system (MCS) of the machining device 140. In some cases, the computing device 150 may apply the best-fit transformation to the WCS. This ensures that the machining tool 145 follows an aligned path that corresponds to the corrected geometry of the aircraft component 190.

In some aspects, the computing device 150 determines how much material to leave on or remove from the aircraft component 190 along the corrected path of the machining tool 145. This ensures that the final shape of the aircraft component 190, after geometric adaptive machining, closely matches the target geometry of the aircraft component 190. By calculating material removal or addition with precision, the computing device 150 ensures that the aircraft component 190 conforms to the target design tolerances.

In certain implementations, the computing device 150 computes the predicted machining distortions at one or more cross-sections of the aircraft component 190. This operation helps to account for possible material deformation changes and changes in shape of the aircraft component 190 during the machining process, as material removal can result in distortions due to the aircraft component's inherent material properties or the machining process itself. By predicting these changes, the computing device 150 can adjust the path of the machining tool 145 to compensate for these distortions, ensuring that the final geometry of the aircraft component 190 aligns with the target shape.

In some aspects, the computing device 150 may apply statistical corrections to any deviations detected between the actual geometry of the aircraft component 190 and the selected geometric model. This may be achieved by the computing device 150 by performing a 3-dimensional best fit, which helps to refine the path of the machining tool 145. The computing device 150 may then generate a morphed geometry that represents the final post-machining shape of the aircraft component 190, ensuring that the aircraft component 190 meets the required specifications. This morphed geometry may be used by the computing device 150 to guide the machining tool 145 of the machining device 140 to follow a corrected path that brings the aircraft component 190 closer to its desired final post-machining shape and size.

In certain implementations, to ensure the accuracy of the machining process and/or to ensure that the machining process results in an aircraft component 190 with a geometry that is compliant, the computing device 150 performs an Airfoil Dimensional Analysis (AFDA) check. This check verifies whether the 3-dimensional morphed geometry of the aircraft component 190 meets the required dimensional tolerances relative to the target geometry of the aircraft component 190. The AFDA check is a quality assurance step in the machining process to enable a machined aircraft component 190 to meet all necessary specifications before finalizing the machining operation.

If the AFDA check passes, the computing device 150 may use the corrected path based on the 3-dimensional morphed geometry to guide the machining tool 145 along the corrected machining path, ensuring that the final post-machining shape of the aircraft component 190 is achieved. However, if the AFDA check fails, the computing device 150 may introduce material stock adders or material removals at one or more points along the corrected path of the machining tool 145. This adjustment allows the computing device 150 to compensate for deviations detected during the AFDA check and ensures that the final shape of the aircraft component 190 conforms to the post-machining target geometry, thereby ensuring that the machining operation, after it is performed, results in an aircraft component 190 with a size and shape that precisely match the target size and shape of the aircraft component 190.

Generally, the need for path corrections may arise from several factors that may impact the accuracy of the machining process. First, inaccuracies in the nominal target geometry can lead to discrepancies between the intended and actual machining paths. Second, distortions induced during the fixturing process may cause deviations in the positioning of the aircraft component 190, further necessitating path corrections. Additionally, inaccuracies in the extrapolation scheme used by the geometric adaptive machining system can affect the precision of the morphed geometry, thereby influencing the generated toolpath. Another contributing factor may be the density of the measurement points and how well they resolve the section splines. A higher density of measurement points may improve the precision of the 3D geometric model, ensuring that the generated toolpath more accurately reflects the target geometry. As the toolpath is a direct outcome of the morphed geometry—representing the target shape to be machined—any improvement in the accuracy of the morph may directly enhance the toolpath's accuracy. Therefore, refining the accuracy of the morphing process and addressing these sources of inaccuracy may facilitate achieving a final post-machining shape that closely matches the desired target geometry of the aircraft component 190.

Figure 2:
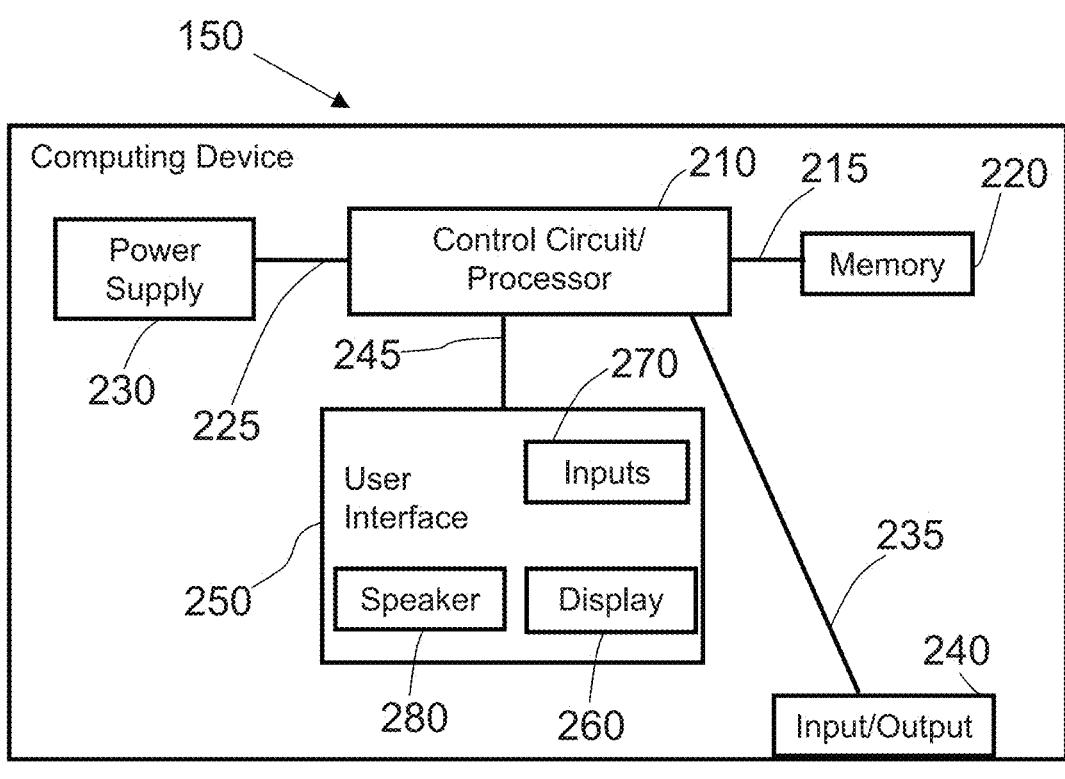
FIG. 2 is a block diagram of a computing device in accordance with some embodiments.

With reference to FIG. 2, an exemplary computing device 150 usable with the systems and methods described herein may include a control circuit 210 including a programmable processor (e.g., a microprocessor or a microcontroller) electrically coupled via a connection 215 to a memory 220 and via a connection 225 to a power supply 230. The control circuit 210 can comprise a fixed-purpose hard-wired platform or can comprise a partially or wholly programmable platform, such as a microcontroller, an application-specific integrated circuit, a field programmable gate array, and so on. These architectural options are well known and understood in the art and require no further description here.

In some aspects, the control circuit 210 may (for example, by using corresponding electronic instructions stored in the memory 220) carry out one or more of the steps, actions, and/or functions described herein. In some embodiments, the memory 220 may be integral to the processor-based control circuit 210 or can be physically discrete (in whole or in part) from the control circuit 210 and may non-transitorily store the computer instructions that, when executed by the control circuit 210, cause the control circuit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

In the illustrated embodiment, the control circuit 210 of the computing device 150 is also electrically coupled via a connection 235 to an input/output 240 that can receive signals from, for example, from the measurement device 110, machining device 140, electronic database 160, and/or from another electronic device of the system 100. The input/output 240 of the computing device 150 can also send signals to other devices, for example, a control signal to the machining device 140 that dictates the patch of movement of the machining tool 145 during the machining of the aircraft component 190, a signal to the electronic database 160 to obtain data therefrom or to transmit data for storage thereto, etc.

The processor-based control circuit 210 of the computing device 150 shown in FIG. 2 is electrically coupled via a connection 245 to a user interface 250, which may include a visual display or display screen 260 (e.g., LED screen) and/or button input 270 that provide the user interface 250 with the ability to permit an operator of the computing device 150 tasked with managing/overseeing the machining process to manually control the computing device 150 by inputting commands via touch-screen and/or button operation and/or voice commands.

In some aspects, the manual control by an operator of the computing device 150 may be via the user interface 250 of the computing device 150, via another electronic device of the operator, or via another user interface and/or switch, and may include an option to modify/update the path of the machining tool 145 of the machining device 140 during the machining of the aircraft component 190. In some embodiments, the user interface 250 of the computing device 150 may also include a speaker 280 that provides audible feedback (e.g., alerts) to the operator of the computing device 150. It will be appreciated that the performance of such functions by the control circuit 210 is not dependent on a human operator, and that the control circuit 210 may be programmed to perform such functions without a human operator.

Figure 3:
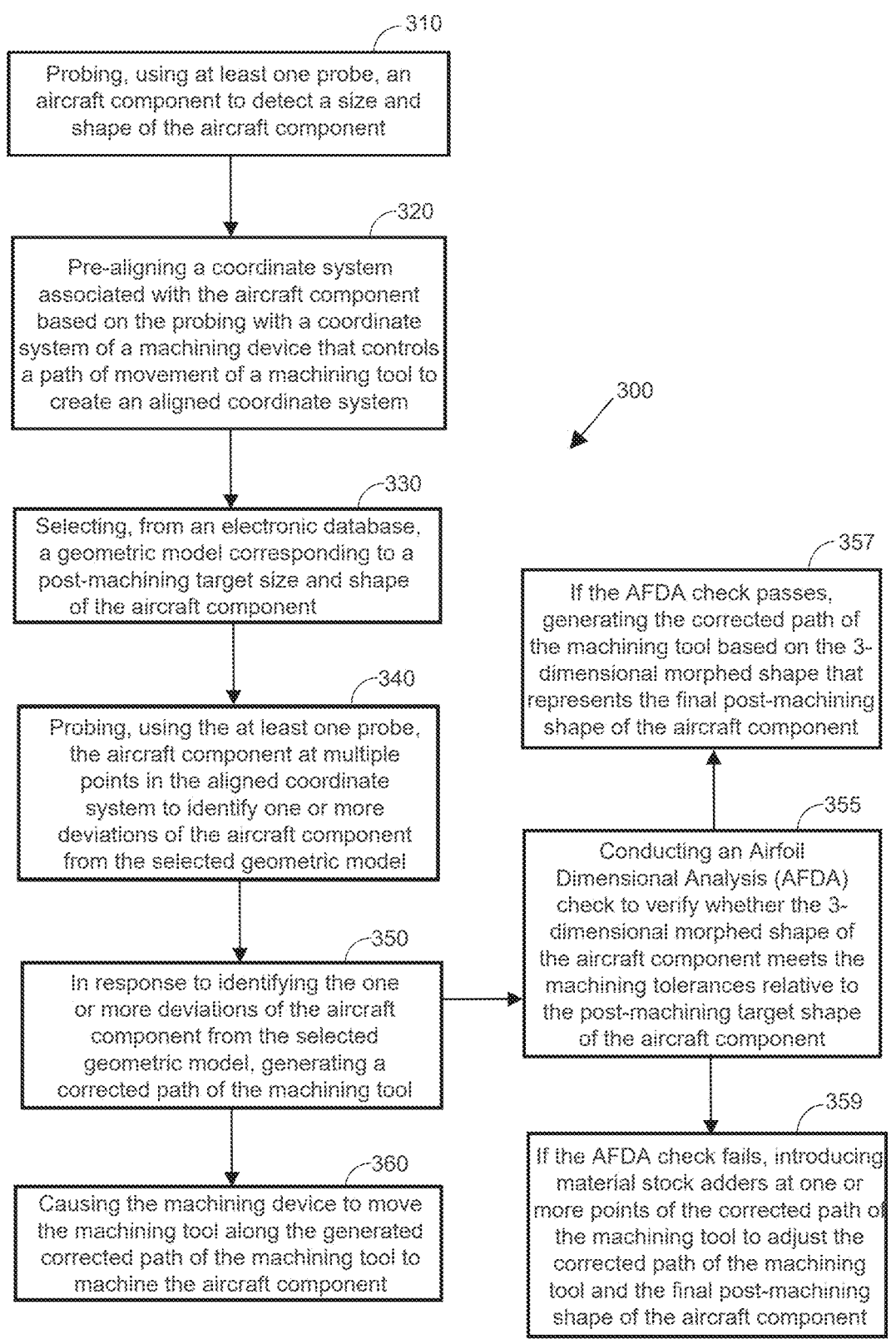
FIG. 3 is a flow chart of a method in accordance with several embodiments.

FIG. 3 is a flow chart depicting an example process 300 of reshaping and reconstructing an aircraft component 190 via geometric adaptive machining. The process 300 may be performed using the system 100. In some embodiments, the computing device 150 may be configured to perform some or all of the aspects of the process 300 of FIG. 3. For example, the process 300 may be implemented by the processor-based control circuit 210 of the computing device 150 that when executing electronic instructions stored in the memory 220 cause the processor-based control circuit 210 to carry out one or more steps, actions, or functions described below.

In the embodiment illustrated in FIG. 3 the process 300 includes measuring, using at least one measurement device 110, an aircraft component 190 to detect an overall current size and shape of the aircraft component 190 (step 310). Notably, step 310 of the process 300 may be optional in some embodiments. During step 310, the aircraft component 190 may be mounted on a component fixture 185 that is compatible in size and shape with the aircraft component 190, and the component fixture 185 may be mounted on a base plate 180 to ensure proper alignment and stability of the aircraft component 190 during the measuring step 310 and the other steps of the process 300. Again, as pointed out above, the use of the base plate and/or component fixture 185 may be optional in some embodiments.

Generally, the measuring step 310 of the process 300 enables a measurement device 110 (e.g., a probe, a vision system, etc.) to capture geometrical data, such as the overall chord length of the aircraft component 190 (which may be determined, for example, by measuring the distance between the leading edge of the aircraft component 190 and the trailing edge of the aircraft component 190), the shape of the aircraft component 190 (which may be determined, for example, but measuring designated reference points on a surface of the aircraft component 190), a thickness of the aircraft component 190, the twist of the aircraft component 190, and other physical attributes of the aircraft component 190. In one example, the aircraft component 190 may be an airfoil 402 with leading edge 412 and trailing edge 414 as shown in FIG. 4. Other examples are possible. The measurement data obtained during step 310 may enable the subsequent assessment of the deviations of the aircraft component 190 from the target post-machining geometry of the aircraft component 190.

In the embodiment illustrated in FIG. 3, the process 300 includes pre-aligning a coordinate system associated with the aircraft component 190 based on the measuring with a coordinate system of a machining device 140 that controls a path of movement of a machining tool 145 to create an aligned coordinate system (step 320). As mentioned above, step 320 may include pre-aligning a Workpiece Coordinate System (WCS) associated with the aircraft component 190 and a machining coordinate system (MCS) associated with the machining device 140 and with the predicted path of the machining tool 145 of the machining device 140.

In certain aspects, during the pre-aligning step 320, a 3-dimensional technique such as 3D rigid-body transformation may be used to adjust the coordinate system (MCS) of the machining device 140 so that it matches the design coordinate system (WCS) of the aircraft component 190 from a computer-aided design (CAD) and/or computer-aided manufacturing (CAM) system(s) or vice versa. Generally, step 320 of the process 300 helps ensure that the machining tool 145 of the machining device 140 and the aircraft component 190 being repaired/reshaped/machined are aligned correctly without needing special tools or special fixtures to hold the aircraft component 190 in place.

In some aspects, the pre-aligning step 320 may further include the computing device 150 adjusting a position and rotation of the aircraft component 190 in three-dimensional space, using at least one of the six degrees of freedom to best fit the selected geometric model to the size and shape of the aircraft component 190 detected in step 310. Such an adjustment may ensure that the geometry of the aircraft component 190 properly aligns with the post-machining target geometry of the aircraft component 190. In some aspects, step 320 of the process 300 may include the application of a best-fit transformation to the MCS of the machining device 140 that controls the machining tool 145, thereby facilitating more precise machining operations with respect to the aircraft component 190 by the machining tool 145 of the machining device 140.

The process 300 depicted in FIG. 3 further includes the step of selecting, from an electronic database 160, a geometric model corresponding to a post-machining target size and shape of the aircraft component 190 (step 330). In some aspects, the geometric model selected during step 330 may be a reduced chord model, a reduced thickness model, and/or an altered twist model of the aircraft component 190. In certain aspects, the geometric model of the aircraft component 190 is selected during step 330 (based on the size and shape of the aircraft component 190 detected during step 320) by a computing device (e.g., the computing device 150 discussed above) and represents the target (i.e., desired) final (i.e., post-machining) overall shape of the aircraft component 190 after the process 300 is completed.

The process 300 depicted in FIG. 3 further includes the step of measuring, using at least one measurement device 110, the aircraft component 190 at multiple points in the aligned coordinate system to identify (e.g., derive) one or more deviations of the aircraft component 190 from the selected geometric model (step 340). As mentioned above, this measuring may be performed by the measurement device 110 (e.g., a tactile probe, non-tactile vision system, etc.), which may physically touch the aircraft component 190 or scans the aircraft component 190 from a distance.

Generally, in step 340, a measuring operation is conducted in the pre-aligned WCS, which was previously adjusted to the position of the aircraft component 190 and the predicted path of the machining tool 145 of the machining device 140. In some aspects, the measuring step 340 collects positional data from multiple points (i.e., locations) on the aircraft component 190, and deviations between the overall shape of the actual aircraft component 190 and the selected geometric model are identified/determined (e.g., derived using calculations). In some aspects, the deviations are calculated by identifying the difference between the measured positions of the aircraft component 190 from the measurement device 110 and the corresponding target positions as defined in the geometric model selected for this aircraft component 190. Such deviations may appear as gaps, misalignments, or distortions at various points on the surface of the aircraft component 190.

Deviations identified during step 340 can occur in different forms, including but not limited to: dimensional deviations (e.g., differences in size, for example an airfoil or blade being slightly too wide or narrow); shape deviations (e.g., differences in curvature, for example, a twisted or bent airfoil or blade edge); positional deviations (e.g., a part of an airfoil or blade being shifted or misaligned along the XYZ axes). Such deviations, when identified/derived during step 340, provide important information regarding potential machining errors that need to be addressed accounted for by the computing device 150.

In the embodiment illustrated in FIG. 3, the process 300 further includes step 350, namely, in response to identifying one or more deviations of the aircraft component 190 from the selected geometric model, generating a corrected path of the machining tool 145. In certain aspects, the generation of the corrected path of the machining tool 145 in step 350 of the process 300 may include applying statistical corrections to the detected deviation(s) of the aircraft component 190 from the selected geometric model to correct distortions associated with a predicted path of the machining tool 145. Generally speaking, if/when deviations between the overall shape of the aircraft component 190 and the selected geometric model are identified in step 340 of the process 300, in step 350, statistical corrections are applied (e.g., by the computing device 150) to account for (and eliminate) potential distortions.

Such corrections may adjust the predicted path of the machining tool 145 of the machining device 140 to ensure that the final machined aircraft component 190 matches the post-machining target shape of the aircraft component 190 as closely as possible. In certain aspects, the statistical corrections may include the computing device 150 accounting for material variations and machining tolerances relative to the post-machining target shape of the aircraft component 190 and determining how much material to leave on or remove from the aircraft component 190 along the corrected path of the machining tool 145 such that a final post-machining shape of the aircraft component 190 matches the post-machining target shape of the aircraft component 190.

In certain aspects, step 350 may include applying the statistical corrections by taking into account possible changes in shape to the aircraft component 190 due to factors such as thermal expansion and/or material inconsistencies, particularly in areas such as weld lines. In some implementations, step 350 may include the computing device 150 predicting/computing possible distortions associated with a predicted path of the machining tool 145 at one or more cross-sections of the aircraft component 190. Such predictions/calculations by the computing device 150 may help account for potential changes in the shape of the aircraft component 190 while material is removed during the machining by the machining tool 145 and ensuring that the final post-machining shape of the aircraft component 190 is as accurate as possible relative to the target post-machining shape of the aircraft component 190 (which is reflected by the geometric model selected in step 330).

In some aspects, the corrected path of the machining tool 145 of the machining device 140 is generated by the computing device 150 based on the statistical corrections applied to the calculated predicted deviations. The corrected path of the machining tool 145 is designed to ensure that the machining tool 145 removes material from the aircraft component 190 in a way that compensates for the initiallycalculated deviations of the predicted post-machining shape of the aircraft component 190 relative to the geometric model selected for the aircraft component 190 in step 330, and results in an aircraft component 190 with a final post-machining shape that conforms to the target post-machining shape of the aircraft component 190.

In some aspects, the corrected path of the machining tool 145 is created via a process involving 3-dimensional best-fit techniques, which generate a morphed shape representing the predicted final shape of the aircraft component 190 after being machined by the machining tool 145. For example, the process 300 may include the computing device 150 performing a 3-dimensional least-squares best-fit transformation of the overall size and shape of the aircraft component 190 to the selected geometric model and/or creating a 3-dimensional morphed shape of the final post-machining shape of the aircraft component 190 based on the corrected path of the machining tool. The 3D morphed shape may be based on the corrected path of the machining tool 145 may provide an accurate representation of the final predicted shape of the aircraft component 190, adjusted for the calculated possible deviations.

In the embodiment shown in FIG. 3, the process 300 includes conducting an Airfoil Dimensional Analysis (AFDA) check to verify whether the 3-dimensional morphed shape of the aircraft component 190 meets dimensional tolerance relative to the post-machining target shape of the aircraft component 190 (step 355). In certain aspects, step 355 of the process 300 is optional. Generally speaking, the AFDA check ensures that the final post-machining size and shape of the aircraft component 190 is within the desired specifications and meets the desired size and shape and performance criteria for the aircraft component 190.

In the embodiment illustrated in FIG. 3, if the AFDA check passes in step 355, the process 300 includes generating the corrected path of the machining tool 145 based on the 3-dimensional morphed shape that represents the final post-machining shape of the aircraft component 190 (step 357). In some aspects, when the AFDA check passes, the corrected path of the machining tool 145 is finalized, and the machining of the aircraft component 190 proceeds based on this corrected path to achieve the post-machining target shape of the aircraft component. To that end, the process 300 shown in FIG. 3 includes step 360, namely, causing (e.g., via the computing device 150 of FIG. 1) the machining tool 145 of the machining device 140 to machine the aircraft component 190 based on the generated corrected path of the machining tool 145.

On the other hand, if the AFDA check fails in step 355, the process 300 may include the step of introducing material stock adders or material removals at one or more points of the corrected path of the machining tool 145 to adjust the corrected path of the machining tool 145 and the final post-machining shape of the aircraft component 190 (step 359). In some aspects, the adjustments in step 359 may allow the computing device to cause the machining tool 145 of the machining device 140 to compensate for discrepancies and correct any shape distortions calculated/predicted during the AFDA check in step 355. For example, by leaving material on the aircraft component 190 where needed, the process 300 may achieve a final post-machining shape of the aircraft component 190 that meets the desired (i.e., target) shape.

Further aspects of the disclosure are provided by the subject matter of the following clauses:

There is provided a method of reshaping and reconstructing aircraft components via geometric adaptive machining. The method includes; measuring, using at least one tactile probe or non-tactile vision system, an aircraft component to detect a size and shape of the aircraft component; and by a computing device configured to control a machining device including a machining tool: pre-aligning a coordinate system associated with the aircraft component based on the measuring with a coordinate system of the machining device that controls a path of movement of the machining tool to create an aligned coordinate system; selecting, from an electronic database, a geometric model corresponding to a post-machining target size and shape of the aircraft component; measuring, using the at least one tactile probe or non-tactile vision system, the aircraft component at multiple points in the aligned coordinate system to identify one or more deviations of the aircraft component from the selected geometric model; in response to identifying the one or more deviations of the aircraft component from the selected geometric model, generating a corrected path of the machining tool; and causing the machining device to move the machining tool along the generated corrected path of the machining tool to machine the aircraft component.

There is provided a system for reshaping and reconstructing an aircraft components via geometric adaptive machining. The system includes: a measurement device configured to detect a size and shape of the aircraft component; an electronic database storing geometric models corresponding to post-machining target sizes and shapes of aircraft components; a machining device including a machining tool and configured to control a path of movement of the machining tool to machine the aircraft component; and a computing device configured to: pre-align a coordinate system associated with the aircraft component with a coordinate system of the machining device to create an aligned coordinate system; select, from the electronic database, a geometric model corresponding to a post-machining target size and shape of the aircraft component; process measuring data, generated by the at measurement device, of the aircraft component at multiple points in the aligned coordinate system, to identify one or more deviations of the aircraft component from the selected geometric model; in response to an identification of the one or more deviations of the aircraft component from the selected geometric model, generate a corrected path of the machining tool; and cause the machining device to move the machining tool along the generated corrected path of the machining tool to machine the aircraft component.

The system of any preceding clause further comprising a fixture having a size and shape compatible to the size and shape of the aircraft component to permit the aircraft component to be mounted thereon.

The method or system of any preceding clause, wherein the computing device is further configured to process the measurement data generated via the measurement device to: detect a distance between a leading edge of the aircraft component and a trailing edge of the aircraft component to determine an overall chord length of the aircraft component; detect a maximum thickness of the aircraft component including a twist angle; and detect at least one designated reference point on the aircraft component to determine an overall shape of the aircraft component.

The method or system of any preceding clause, wherein the computing device is further configured to: adjust a position and a rotation of the aircraft component in 3-dimensional space using a transformation technique to align the size and shape of the aircraft component to the post-machining target shape of the aircraft component; and apply a transformation to the coordinate system of the machining device to ensure alignment of the path of the machining tool with the post-machining target shape of the aircraft component.

The method or system of any preceding clause, wherein the computing device is further configured to: apply statistical corrections to the one or more deviations to correct distortions associated with a predicted path of the machining tool; account for material variations and machining tolerances relative to the post-machining target shape of the aircraft component; and determine how much material to leave on or remove from the aircraft component along the corrected path of the machining tool such that a final post-machining shape of the aircraft component matches the post-machining target shape of the aircraft component.

The method or system of any preceding clause, wherein the computing device is further configured to: compute the distortions associated with a predicted path of the machining tool at one or more cross-sections of the aircraft component to account for material deformations and shape changes of the aircraft component during the machining of the aircraft component by the machining tool.

The method or system of any preceding clause, wherein the computing device is further configured to: to apply the statistical corrections to the one or more deviations of the aircraft component from the selected geometric model by virtue at least one of: performing a 3-dimensional least-squares best-fit transformation of the size and shape of the aircraft component to the selected geometric model; and creating a 3-dimensional morphed shape of the final post-machining shape of the aircraft component based on the corrected path of the machining tool.

The method or system of any preceding clause, wherein the computing device is further configured to conduct an Airfoil Dimensional Analysis (AFDA) check to verify whether the 3-dimensional morphed shape of the aircraft component meets the machining tolerances relative to the post-machining target shape of the aircraft component. If the AFDA check passes, the computing device is configured to generate the corrected path of the machining tool based on the 3-dimensional morphed shape that represents the final post-machining shape of the aircraft component. If the AFDA check fails, the computing device is configured to introduce material stock adders or material removals at one or more points of the corrected path of the machining tool to adjust the corrected path of the machining tool and the final post-machining shape of the aircraft component.

Those skilled in the art will recognize that a wide variety of other modifications, alterations, and combinations can also be made with respect to the above-described embodiments without departing from the scope of the disclosure, and that such modifications, alterations, and combinations are to be viewed as being within the ambit of the inventive concept.

The invention claimed is:

1. A method of reshaping and reconstructing aircraft components via geometric adaptive machining, the method comprising:
  measuring, using at least one tactile probe or non-tactile vision system, an aircraft component to detect a size and shape of the aircraft component; and
  by a computing device configured to control a machining device including a machining tool:
    pre-aligning a coordinate system associated with the aircraft component based on the measuring with a coordinate system of the machining device that controls a path of movement of the machining tool to create an aligned coordinate system;

selecting, from an electronic database, a geometric model corresponding to a post-machining target size and shape of the aircraft component;
measuring, using the at least one tactile probe or non-tactile vision system, the aircraft component at multiple points in the aligned coordinate system to identify one or more deviations of the aircraft component from the selected geometric model;
wherein the measuring of the aircraft component to detect the size and shape of the aircraft component further comprises:
  detecting a distance between one edge of the aircraft component and an opposite edge of the aircraft component to determine an overall length or width of the aircraft component:
  detecting a maximum thickness of the aircraft component; and
  detecting at least one designated reference point on the aircraft component to determine an overall shape of the aircraft component;
in response to identifying the one or more deviations of the aircraft component from the selected geometric model, generating a corrected path of the machining tool; and
causing the machining device to move the machining tool along the generated corrected path of the machining tool to machine the aircraft component.

2. The method of claim 1, wherein the measuring of the aircraft component to detect the size and shape of the aircraft component further comprises mounting the aircraft component to a fixture having a size and shape compatible to the size and shape of the aircraft component.

3. The method of claim 1, wherein the pre-aligning further comprises:
  adjusting a position and a rotation of the aircraft component in 3-dimensional space using a transformation technique to align the size and shape of the aircraft component to the post-machining target shape of the aircraft component; and
  applying a transformation to the coordinate system of the machining device to ensure alignment of the path of the machining tool with the post-machining target shape of the aircraft component.

4. The method of claim 1, wherein the generating the corrected path of the machining tool further comprises:
  applying statistical corrections to the one or more deviations to correct distortions associated with a predicted path of the machining tool;
  accounting for material variations and machining tolerances relative to the post-machining target shape of the aircraft component; and
  determining how much material to leave on or remove from the aircraft component along the corrected path of the machining tool such that a final post-machining shape of the aircraft component matches the post-machining target shape of the aircraft component.

5. The method of claim 4, further comprising computing the distortions associated with a predicted path of the machining tool at one or more cross-sections of the aircraft component to account for material deformations and shape changes of the aircraft component during the machining of the aircraft component by the machining tool.

6. The method of claim 4, wherein the applying of the statistical corrections to the one or more deviations of the aircraft component from the selected geometric model further comprises at least one of: performing a 3-dimensional least-squares best-fit transformation of the size and shape of the aircraft component to the selected geometric model, and creating a 3-dimensional morphed shape of the final post-machining shape of the aircraft component based on the corrected path of the machining tool.

7. The method of claim 6, further comprising conducting an Airfoil Dimensional Analysis (AFDA) check to verify whether the 3-dimensional morphed shape of the aircraft component meets the machining tolerances relative to the post-machining target shape of the aircraft component.

8. The method of claim 7, further comprising, if the AFDA check passes, generating the corrected path of the machining tool based on the 3-dimensional morphed shape that represents the final post-machining shape of the aircraft component.

9. The method of claim 7, further comprising, if the AFDA check fails, introducing material stock adders at one or more points of the corrected path of the machining tool to adjust the corrected path of the machining tool and the final post-machining shape of the aircraft component.

10. A system for reshaping and reconstructing an aircraft component via geometric adaptive machining, the system comprising:
- a measurement device configured to detect a size and shape of the aircraft component, wherein the measurement device is a tactile probe or a non-tactile vision system;
- an electronic database storing geometric models corresponding to post-machining target sizes and shapes of aircraft components;
- a machining device including a machining tool and configured to control a path of movement of the machining tool to machine the aircraft component; and
- a computing device configured to:
  - pre-align a coordinate system associated with the aircraft component with a coordinate system of the machining device to create an aligned coordinate system;
  - select, from the electronic database, a geometric model corresponding to a post-machining target size and shape of the aircraft component;
  - process measurement data, generated by the measurement device, of the aircraft component at multiple points in the aligned coordinate system, to identify one or more deviations of the aircraft component from the selected geometric model;
  - wherein the computing device is further configured to process the measurement data generated via the measurement device to:
  - detect a distance between one edge of the aircraft component and an opposite edge of the aircraft component to determine an overall length or width of the aircraft component;
  - detect a maximum thickness of the aircraft component; and
  - detect at least one designated reference point on the aircraft component to determine an overall shape of the aircraft component;
  - in response to an identification of the one or more deviations of the aircraft component from the selected geometric model, generate a corrected path of the machining tool; and
  - cause the machining device to move the machining tool along the generated corrected path of the machining tool to machine the aircraft component.

11. The system of claim 10, further comprising a fixture having a size and shape compatible to the size and shape of the aircraft component to permit the aircraft component to be mounted thereon.

12. The system of claim 10, wherein the computing device is further configured to:
- adjust a position and a rotation of the aircraft component in 3-dimensional space using a transformation technique to align the size and shape of the aircraft component to the post-machining target shape of the aircraft component; and
- apply a transformation to the coordinate system of the machining device to ensure alignment of the path of the machining tool with the post-machining target shape of the aircraft component.

13. The system of claim 10, wherein the computing device is further configured to:
- apply statistical corrections to the one or more deviations to correct distortions associated with a predicted path of the machining tool;
- account for material variations and machining tolerances relative to the post-machining target shape of the aircraft component; and
- determine how much material to leave on or remove from the aircraft component along the corrected path of the machining tool such that a final post-machining shape of the aircraft component matches the post-machining target shape of the aircraft component.

14. The system of claim 13, wherein the computing device is further configured to compute the distortions associated with a predicted path of the machining tool at one or more cross-sections of the aircraft component to account for material deformations and shape changes of the aircraft component during the machining of the aircraft component by the machining tool.

15. The system of claim 13, wherein the computing device is further configured to apply the statistical corrections to the one or more deviations of the aircraft component from the selected geometric model by virtue at least one of:
- performing a 3-dimensional least-squares best-fit transformation of the size and shape of the aircraft component to the selected geometric model; and
- creating a 3-dimensional morphed shape of the final post-machining shape of the aircraft component based on the corrected path of the machining tool.

16. The system of claim 15, wherein the computing device is further configured to conduct an Airfoil Dimensional Analysis (AFDA) check to verify whether the 3-dimensional morphed shape of the aircraft component meets the machining tolerances relative to the post-machining target shape of the aircraft component.

17. The system of claim 16, wherein the computing device is further configured to, if the AFDA check passes, generate the corrected path of the machining tool based on the 3-dimensional morphed shape that represents the final post-machining shape of the aircraft component.

18. The system of claim 16, wherein the computing device is further configured to, if the AFDA check fails, introduce material stock adders or material removals at one or more points of the corrected path of the machining tool to adjust the corrected path of the machining tool and the final post-machining shape of the aircraft component.

* * * * *